US010418910B2

United States Patent
Wong et al.

(10) Patent No.: US 10,418,910 B2
(45) Date of Patent: Sep. 17, 2019

(54) ISOLATED SWITCH-MODE POWER SUPPLY AND CONTROL CIRCUIT AND CONTROL METHOD FOR ISOLATED SWITCH-MODE POWER SUPPLY

(71) Applicant: Joulwatt Technology (Hangzhou)Co., LTD., Hangzhou (CN)

(72) Inventors: Pitleong Wong, Hangzhou (CN); Xunwei Zhou, Hangzhou (CN)

(73) Assignee: JOULWATT TECHNOLOGY (HANGZHOU)CO., LTD., Hangzhou (CN)

( * ) Notice: Subject to any disclaimer, the term of this patent is extended or adjusted under 35 U.S.C. 154(b) by 0 days.

(21) Appl. No.: 16/100,372

(22) Filed: Aug. 10, 2018

(65) Prior Publication Data

US 2019/0068072 A1    Feb. 28, 2019

(30) Foreign Application Priority Data

Aug. 28, 2017  (CN) .......................... 2017 1 0752991

(51) Int. Cl.
| | |
|---|---|
| *H02M 3/335* | (2006.01) |
| *H02M 1/08* | (2006.01) |
| *H02M 1/32* | (2007.01) |
| *H02M 1/00* | (2006.01) |

(52) U.S. Cl.
CPC ......... *H02M 3/33592* (2013.01); *H02M 1/08* (2013.01); *H02M 1/32* (2013.01); *H02M 2001/0029* (2013.01)

(58) Field of Classification Search
CPC ......... H02M 3/33592; H02M 3/33507; H02M 3/33523; H02M 3/335; H02M 3/33515; H02M 3/33576; H02M 3/33561; H02M 3/1563; H02M 3/3385; H02M 2001/0029; H02M 1/08; H02M 1/32
See application file for complete search history.

(56) References Cited

U.S. PATENT DOCUMENTS

| | | | | |
|---|---|---|---|---|
| 9,780,635 B1 * | 10/2017 | Lam | ........................ | H02M 1/00 |
| 2010/0208502 A1 * | 8/2010 | Horii | .................. | H02M 3/33507 363/131 |
| 2017/0099711 A1 * | 4/2017 | Polley | .................. | A61B 5/7225 |
| 2018/0097447 A1 * | 4/2018 | Iorio | .................... | H03K 17/163 |
| 2018/0248466 A1 * | 8/2018 | Pham | ..................... | H02M 1/08 |

\* cited by examiner

*Primary Examiner* — Jue Zhang
*Assistant Examiner* — Kevin H Sprenger
(74) *Attorney, Agent, or Firm* — Gokalp Bayramoglu

(57) ABSTRACT

The present invention discloses an isolated switch-mode power supply, a control circuit and a control method thereof. The main power transistor and the synchronous rectifier transistor are connected respectively to the primary-side winding and secondary-side winding of the isolated switch-mode power supply. The voltage of the control terminal of the main power transistor starts to increase, the main power transistor is turned on gradually, the current flowing through the main power transistor starts to increase until reaches the predetermined current-limiting value; the current of the main power transistor is maintained at the current-limiting value by controlling the voltage of the control terminal of the main power transistor; the secondary-side synchronous rectifier transistor is turned off, the current of the main power transistor decreases from the current-limiting value to the normal operation value, and the main power transistor is completely in an ON condition.

12 Claims, 4 Drawing Sheets

ISOLATED SWITCH-MODE POWER SUPPLY AND CONTROL CIRCUIT AND CONTROL METHOD FOR ISOLATED SWITCH-MODE POWER SUPPLY

CROSS REFERENCE TO THE RELATED APPLICATIONS

This application is based upon and claims priority to Chinese Patent Application No. CN201710752991.2, filed on Aug. 28, 2017, the entire contents of which are incorporated herein by reference.

TECHNICAL FIELD

The present invention relates to the field of power electronics, particularly to an isolated switch-mode power supply and a control circuit and a method for controlling the isolated switch-mode power supply.

BACKGROUND

In practice, the isolated switch-mode power supplies are used in many applications. In the prior art, generally, an isolated switch-mode power supply includes a main power transistor, a transformer, and a freewheeling diode or a freewheeling Metal-Oxide-Semiconductor (MOS) transistor. The primary-side control circuit controls the conduction time of the main power transistor. If the MOS transistor is used in freewheeling, the secondary-side control circuit will control the conduction time of the MOS transistor. In some cases, the isolated switch-mode power supply is required to operate in continuous conduction mode (CCM). In this mode, the freewheeling MOS transistor is turned off and the main power transistor is turned on when the current of the secondary-side winding has not yet reduced to zero. However, if the freewheeling MOS transistor is not turned off on time, the situation where the main power transistor has been turned on while current still exists in the secondary-side winding will be caused. In this case, an excessive high current will flow through the main power transistor, thereby causing a shoot-through phenomenon in the main power transistor, which has a great impact on system reliability and Electro Magnetic Interference (EMI), and can easily damage the power transistor.

FIG. 1 is a partial structural schematic view of a flyback switch-mode power supply in the prior art. In the FIG. 1, M1 is the main power transistor, M2 is the freewheeling MOS transistor, Ci and Co are energy-storage capacitors, L1 and L2 are primary-side winding and secondary-side winding of the transformer, respectively, and N1 and N2 are the number of turns of the primary-side winding and the secondary-side winding, respectively. The primary-side control circuit is connected to the control terminal of M1 to control the on-off state of the main power transistor M1. The secondary-side control circuit is connected to the control terminal of M2 to control the on-off state of the freewheeling MOS transistor M2. When the switch-mode power supply works in the continuous conduction mode (CCM), there is a situation where the main power transistor M1 is turned on while the freewheeling MOS transistor M2 has not yet been turned off. In this case, there is a current flowing through the secondary side winding, and the voltage drop of the main power transistor M1 is: $U_{M1}=Ui+(N1/N2)*Uo$. As a result, a large current overshoot will occur in the main power transistor M1, thereby causing a shoot-through like phenomenon in the main power transistor, which has a great impact on system reliability and Electro Magnetic Interference (EMI).

SUMMARY

Considering the above-mentioned problems, an isolated switch-mode power supply, and a control circuit and a method for controlling the isolated switch-mode power supply are provided by the present invention to solve the technical problems that when the isolated power supply works in the CCM, the main power transistor is turned on while the freewheeling MOS transistor has not yet been turned off, thereby causing a large current overshoot in the main power transistor and a shoot-through like phenomenon of the main power transistor in the prior art.

The present invention provides a control circuit of isolated switch-mode power supply, which is configured to control a main power transistor in the isolated switch-mode power supply. The main power transistor is connected to a primary-side winding of the isolated switch-mode power supply, and a synchronous rectifier transistor is connected to a secondary-side winding of the isolated switch-mode power supply. The control circuit of isolated switch-mode power supply is characterized in that it includes a current-limiting module, a driving circuit for receiving a control signal, wherein, in the turn-on process, when the control signal is changed from an invalidation state to a validation state that represents turn-on, a voltage of a control terminal of the main power transistor starts to increase, and the current-limiting module starts to work; as the voltage of the control terminal increases, the main power transistor is turned on gradually, a current flowing through the main power transistor also starts to increase until it reaches a predetermined current-limiting value under an adjustment of the current-limiting module.

The current of the main power transistor is maintained at the current-limiting value by controlling the voltage of the control terminal of the main power transistor. The synchronous rectifier transistor is turned off, an impedance between a drain terminal and a source terminal of the main power transistor decreases, and a drain-source voltage decreases, continuously.

The current of the main power transistor decreases from the current-limiting value to the normal operation value. The voltage of the control terminal of the main power transistor increases again and reaches a maximum value. In this case, the main power transistor is completely in ON condition.

Optionally, the current of the main power transistor is maintained at the current-limiting value. The drain-source voltage of the main power transistor starts to decrease until the synchronous rectifier transistor is turned off.

Optionally, the control circuit further includes a logic control module. The logic control module receives the control signal. According to the control signal, when the control signal is invalid, the logic control module makes the current-limiting module not to work, and the voltage of the control terminal of the main power transistor is pulled down; when the control signal is valid, the logic control module makes the current-limiting module to start working.

Optionally, the control circuit of the isolated switch-mode power supply includes a first operational amplifier. A first input terminal of the first operational amplifier receives a first reference signal. A second input terminal of the first operational amplifier receives a sampling signal representing a current flowing through the main power transistor. An output terminal of the first operational amplifier is connected to the control terminal of the main power transistor.

Optionally, the control circuit further includes the first resistor. The main power transistor is connected to a low potential terminal of an input voltage through the first resistor. The second input terminal of the first operational amplifier is connected to a common terminal of the main power transistor and the first resistor.

The present invention further provides a control method of the isolated switch-mode power supply to control the main power transistor in the isolated switch-mode power supply. The main power transistor is connected to the primary-side winding of the isolated switch-mode power supply. The synchronous rectifier transistor is connected to the secondary-side winding of the isolated switch-mode power supply. The turn-on process of the main power transistor includes the following stages.

The first stage: the control terminal of the main power transistor receives a control signal, when the control signal is changed from an invalidation state to a validation state that represents turn-on, the voltage of the control terminal of the main power transistor starts to increase. As the voltage of the control terminal increases, the main power transistor is turned on gradually. The current flowing through the main power transistor also starts to increase until it reaches the predetermined current-limiting value.

The second stage: the current of the main power transistor is maintained at the current-limiting value by controlling the voltage of the control terminal of the main power transistor. The synchronous rectifier transistor is turned off, the impedance between the drain terminal and the source terminal of the main power transistor decreases, and the drain-source voltage decreases continuously.

The third stage: the current of the main power transistor decreases from the current-limiting value to the normal operation value. The voltage of the control terminal of the main power transistor increases again and reaches the maximum value. In this case, the main power transistor is completely in ON condition.

Optionally, the maintenance of the current of the main power transistor at the current-limiting value is realized by the following steps. The current flowing through the main power transistor is sampled, then the sampled current signal and a predetermined current-limiting reference are subjected to an error processing. According to an error processing result, the voltage of the control terminal of the main power transistor is adjusted to make the current of the main power transistor equal to the current-limiting value.

The present invention further provides an isolated switch-mode power supply which includes any one of the above-mentioned control circuit of isolated switch-mode power supply.

The present invention further provides a driving method of the switch-mode transistor to control the main power transistor in the isolated switch-mode power supply. The main power transistor is connected to the primary-side winding of the isolated switch-mode power supply. The synchronous rectifier transistor is connected to the secondary-side winding of the isolated switch-mode power supply, characterized in that the turn-on process of the switch-mode transistor includes the following stages.

The first stage: the control terminal of the main power transistor receives a control signal. When the control signal is changed from an invalidation state to a validation state that represents the turn-on, the voltage between the gate terminal and the source terminal of the main power transistor starts to decrease. As the gate-source voltage decreases, the main power transistor is turned on gradually. The current flowing through the main power transistor also starts to increase, until it reaches the predetermined current-limiting value.

The second stage: the current of the main power transistor is maintained at the current-limiting value by controlling the gate-source voltage of the main power transistor. The synchronous rectifier transistor is turned off, the impedance between the drain terminal and the source terminal of the main power transistor decreases, and an absolute value of the drain-source voltage decreases continuously.

The third stage: the current of the main power transistor decreases from the current-limiting value to a normal operation value. The gate-source voltage of the main power transistor decreases again and the absolute value of the gate-source voltage reaches the maximum value. In this case, the main power transistor is completely in ON condition.

Compared with the prior art, the technical solution of the present invention has the following advantages. In the isolated switch-mode power supply, the turn-on process of the main power transistor can be roughly divided into three stages, so as to complete the current limiting of the current flowing through the main power transistor and thus prevent the current overshoot. There are multiple implementations for current-limiting, which aim to make the current of the power transistor reach the predetermined turn-on limiting current rapidly and maintain this current until the main power transistor is completely in ON condition, such that in the case of CCM, the reverse current of the secondary-side synchronous rectifier MOS transistor is under control. The present invention can effectively control the current of the main power transistor in the turn-on process and avoid a shoot-through like phenomenon caused by a large current applied to the main power transistor.

DETAILED DESCRIPTION OF THE EMBODIMENTS

The preferred embodiments of the present invention will be described in detail hereinafter with reference to the drawings. The present invention, however, is not limited to these embodiments. Any substitution, modification, and equivalent derived from the spirit and scope of the present invention are covered by the present invention.

In order to make the public understand the present invention better, the details are explicitly described in the following preferred embodiments of the present invention, and a person skilled in the art can fully understand the present invention without these details.

The present invention is described in more details with reference to the drawings by giving examples in the following paragraphs. It should be noted that the drawings are all shown in a simplified form and with less-precise scale for the purpose of conveniently and clearly facilitating the illustration of the embodiments of the present invention.

In a switch-mode power supply, the output voltage of the switch-mode power supply is usually used as a feedback signal, so as to determine how to supply power to the load according to the value of the voltage. In most practical applications, the output terminal of the switch-mode power supply is provided with an output voltage sampling terminal. The voltage of the sampling terminal is used as the feedback signal to determine how to supply power to the load.

Figure 1:
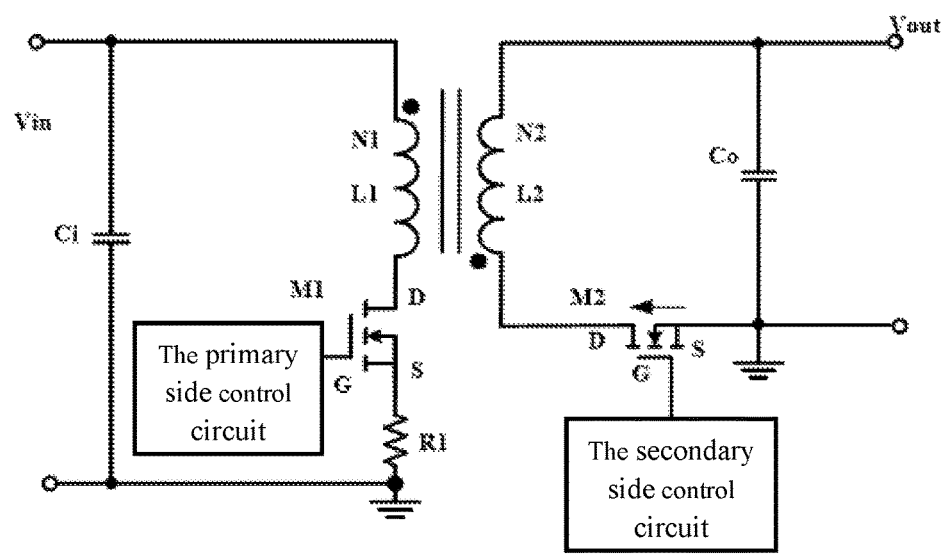
FIG. 1 is a structural schematic diagram of a control circuit of an isolated switch-mode power supply in prior art.
Figure 2:
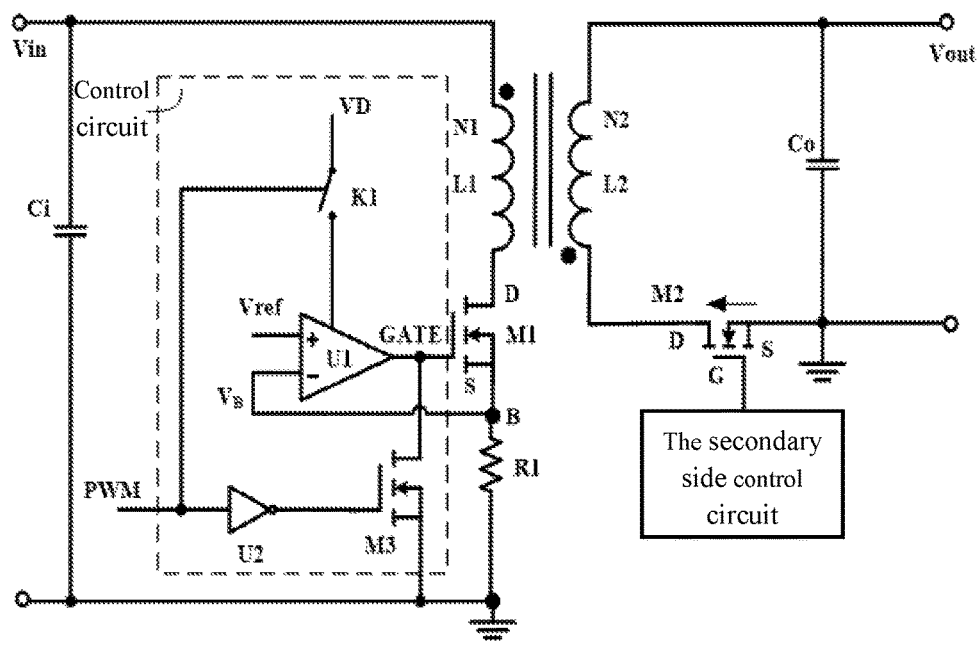
FIG. 2 is a structural schematic diagram showing an embodiment of a control circuit of an isolated switch-mode power supply according to the present invention.

As shown in FIG. 2, a circuit of one embodiment of the control circuit of an isolated switch-mode power supply according to the present invention is illustrated. The isolated switch-mode power supply is a flyback circuit which includes a main power transistor M1, a transformer (including the primary-side winding and the secondary-side winding), a synchronous rectifier transistor M2, and a first resistor R1. One end of the primary-side winding of the transformer is connected to the high potential terminal of the input voltage, and the other end of the primary-side winding of the transformer is connected to the first power terminal of the main power transistor M1. The second power terminal of the main power transistor M1 is connected to one end of the first resistor R1, and the other end of the first resistor R1 is connected to the low potential terminal of the input voltage. One end of the secondary-side winding of the transformer is connected to the high potential terminal of the output voltage, the other end of the secondary-side winding of the transformer is connected to the first power terminal of the synchronous rectifier transistor M2, and the second power terminal of the synchronous rectifier transistor M2 is connected to the low potential terminal of the output voltage.

Figure 3:
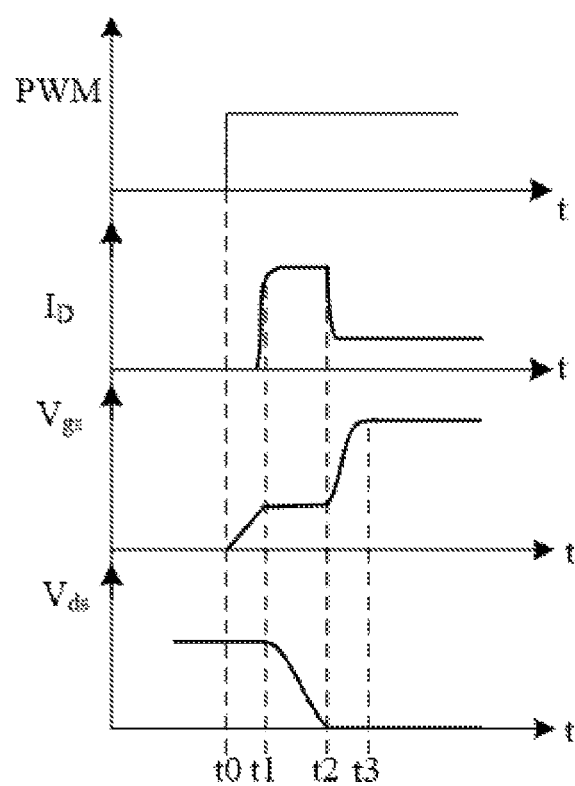
FIG. 3 shows operating waveforms of the present invention (N-type MOS transistor).

The control circuit of the isolated switch-mode power supply controls the turn-on process of the main power transistor, so that the turn-on process of the main power transistor includes the following stages. Referring to FIG. 3, the waveforms of the Pulse Width Modulation (PWM) signal, the current flowing through the main power $I_D$, the gate-source voltage Vgs, and the drain-source voltage Vds in the working mode of the present invention are illustrated, which mainly reflect the waveforms in the turn-on and driving process. The PWM signal is a voltage signal at the control terminal of the main power transistor. The use of PWM signal for controlling is one of the control methods for controlling the power switch-mode transistor. The PWM signal includes a valid part and an invalid part, which constitute a switching cycle. The ratio of the valid part to the entire switching cycle is known as duty ratio. Taking the N-type MOS transistor as an example, the high-level part of the PWM signal is valid, and the low-level part thereof is invalid. In the figure, for example, assuming that the high-level part represents validation, generally, the validation can be regarded as turn-on, and the invalidation can be regarded as turn-off.

The first stage (t0-t1): when the control signal of the main power transistor is changed from an invalidation state to a validation state that represents turn-on, the voltage of the control terminal of the main power transistor starts to increase. As the voltage of the control terminal increases, the main power transistor is turned on gradually, the current flowing through the main power transistor also starts to increase until it reaches the predetermined current-limiting value.

The second stage (t1-t2): the current of the main power transistor is maintained at the current-limiting value by controlling the voltage of the control terminal of the main power transistor. The synchronous rectifier transistor is turned off. The impedance between the drain terminal and the source terminal of the main power transistor decreases, and the drain-source voltage decreases continuously.

The third stage (t2-t3): the current of the main power transistor decreases from the current-limiting value to the normal operation value. The voltage of the control terminal of the main power transistor increases again and reaches the maximum value. In this case, the main power transistor is completely in an ON condition.

The above stages are merely classified based on the variation trend of the waveforms, and there is no strict boundary. The use of stages for illustration is merely intended to facilitate the description rather than constitute any limit to the solution of the present application.

In the present invention, in the case of CCM, the reverse current of the synchronous rectifier transistor M2 of the isolated switch is controlled. The current of the main power transistor is maintained at the current-limiting value. The drain-source voltage of the main power transistor starts to decrease until the synchronous rectifier transistor is turned off. After that, the current in the main power transistor decreases from the current-limiting value to the normal operating value.

Referring to FIG. 2, the circuit of the first embodiment of the present invention is illustrated, which includes the control circuit, the main power transistor M1, and the driving circuit for driving the main power transistor M1. The present invention mainly aims to solve the technical problem in turn-on process of the main power transistor M1. The driving circuit includes the current-limiting module and the logic control module. The logic control module receives the PWM signal. According to the PWM signal, when the PWM signal is at low level, the logic control module controls the current-limiting module not to work, namely, the switch K1 is turned off, so as to cut off the power supply of the power supplying voltage VD to the first operational amplifier U1, and the GATE voltage of the control terminal of the main power transistor M1 is pulled down (switch M3 is driven to be turned on through not-gate U2). When the PWM signal is at high level, the logic control module controls the current-limiting module to start working, namely, the switch K1 is turned on, so that the power supply voltage VD supplies power to the first operational amplifier U1, and M3 is turned off at this time. The current-limiting module includes the first operational amplifier U1. The first input terminal of the first operational amplifier U1 receives the current-limiting reference signal Vref, the second input terminal thereof receives the sampling signal $V_B$ that represents the current flowing through the main power transistor M1, and the output terminal thereof is connected to the control terminal of the main power transistor M1.

In FIG. 2, combined with the waveform of FIG. 3, the specific operating process of the embodiment is as follows. When the PWM signal is at low level, the switch M3 is turned on, the GATE voltage is pulled down, and the MOS transistor (one of the power switching-mode transistors) M1 is turned off, the switch K1 is turned off, the operational amplifier U1 does not pull up the GATE voltage. At time t0 in FIG. 5, the PWM signal changes from low level to high level, the switch M3 is turned off, the switch K1 is turned on, and the operational amplifier U1 is enabled with the power supplied by voltage VD. The resistor R1 is used as the sampling resistor to sample the current of the MOS transistor M1, and is converted into the voltage $V_B$ to be introduced to the negative input terminal of the operational amplifier U1. During the time t0-t1, since the main power transistor M1 has not been turned on, the current thereof is substantially zero. Thus, the GATE voltage starts to increase rapidly from zero. When the GATE voltage increases to a certain degree, the main power transistor M1 is turned on, and the current thereof increases. When the current following through the main power transistor M1 reaches Vref/R1, the operational amplifier U1 adjusts the GATE voltage, so that the current of the main power transistor M1 is maintained at the current-limiting value Vref/R1. Namely, during the time t1-t2, at this moment, the operational amplifier U1 limits the current of the main power transistor M1, the GATE voltage remains substantially constant, and the current-limiting value Vref/R1 is greater than the normal operation current of the main power transistor M1. When the current of the main power transistor become equal to the current-limiting value, the secondary power transistor is turned off. After that, the drain-source voltage of the main power transistor M1 decreases. As to time t2, the drain-source voltage of the main power transistor M1 is already low enough, so the current of the main power transistor M1 approximately become equal to the inductive current, and the voltage $V_B$ of the resistor R1 is also lower than the reference voltage Vref. The output of the operational amplifier U1 increases, so the voltage of the gate terminal of the main power transistor M1 increases. As to time t3, the output of the operational amplifier U1 is saturated, the output voltage reaches its peak value, and the main power transistor M1 is completely in the ON condition.

The main power transistor according to the embodiment shown in FIG. 3 of the present invention is an N-type MOS transistor, but it is also within the scope of the present invention when the main power transistor is a P-type MOS transistor.

Figure 4:
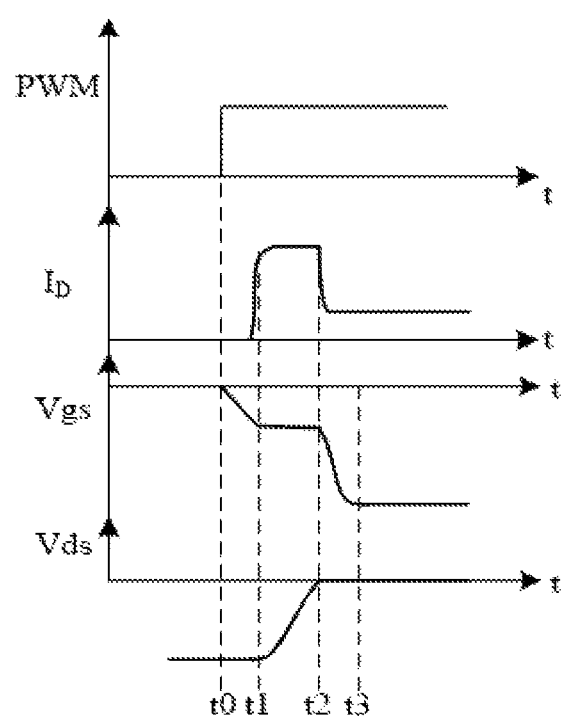
FIG. 4 shows operating waveforms of the present invention (P-type MOS transistor).

The embodiment of the present invention can also take a P-type MOS transistor as the main power transistor in examples. Although, for a P-type MOS transistor, generally, the control terminal or the gate terminal thereof is turned on in low level and turned off in high level, the high level part of the PWM signal is still considered as valid. The gate terminal can be in low level through logic setting or modification, so it is explained here. As shown in FIG. 4, the turn-on process of the switch-mode transistor includes the following stages.

First stage (t0-t1): when the PWM signal of the main power transistor is changed from an invalidation state to a validation state that represents turn-on, the voltage between the gate terminal and the source terminal starts to decrease. As the gate-source voltage increases, the main power transistor is turned on gradually. The current flowing through the main power transistor also starts to increase, until reaches a predetermined current-limiting value.

Second stage (t1-t2): the current of the main power transistor is maintained at the current-limiting value by controlling the gate-source voltage of the main power transistor. The synchronous rectifier transistor is turned off. The impedance between the drain terminal and the source terminal of the main power transistor decreases, and an absolute value of the drain-source voltage decreases, continuously.

Third stage (t2-t3): the current of the main power transistor decreases from the current-limiting value to a normal operation value. The gate-source voltage of the main power transistor decreases again and the absolute value of the gate-source voltage reaches the maximum value. In this case, the main power transistor is completely in the ON condition.

Other processes are the same as the N-type MOS transistor.

The protection scope of the present invention covers all the isolated switch-mode power supplies that contain a main power transistor rather than merely the flyback switch-mode power supply.

Although the above embodiments are described and illustrated separately, for those of ordinary skill in the art, the part of common techniques involved can be replaced and integrated with each other. The contents that are not clearly recited in one embodiment can be determined with reference to another embodiment that recites this part of contents.

The embodiments described above do not constitute limits to the protection scope of the technical solutions. Any modification derived within the spirit and principles of the above-mentioned embodiments should be considered as falling within the scope of the technical solution.

The invention claimed is:

1. A control circuit of an isolated switch-mode power supply for controlling a main power transistor in the isolated switch-mode power supply, wherein the main power transistor is connected to a primary-side winding of the isolated switch-mode power supply;

a synchronous rectifier transistor is connected to a secondary-side winding of the isolated switch-mode power supply, wherein the control circuit of the isolated switch-mode power supply comprises: a current-limiting module, a driving circuit for receiving a control signal, wherein in a turn-on process, when the control signal is changed from an invalidation state to a validation state that represents turn-on, a voltage of a control terminal of the main power transistor starts to increase, and the current-limiting module starts to work;

as the voltage of the control terminal increases, the main power transistor is turned on gradually, and a current flowing through the main power transistor starts to increase until reaches a predetermined current-limiting value under an adjustment of the current-limiting module;

the current flowing through the main power transistor is maintained at the predetermined current-limiting value by controlling the voltage of the control terminal of the main power transistor, the synchronous rectifier transistor is turned off, an impedance between a drain terminal and a source terminal of the main power transistor decreases, and a drain-source voltage decreases continuously; and the current flowing through the main power transistor decreases from the predetermined current-limiting value to a normal operation value, the voltage of the control terminal of the main power transistor increases again and reaches a maximum value, and the main power transistor is completely in an ON condition;

wherein the current-limiting module comprises a first operational amplifier, a first input terminal of the first operational amplifier receives a first reference signal;

a second input terminal of the first operational amplifier receives a sampling signal that represents the current flowing through the main power transistor; and an output terminal of the first operational amplifier is directly connected to the control terminal of the main power transistor;

a power supply to the first operational amplifier is connected through a first switch, a control terminal of the first switch is connected to a pulse width modulation (PWM) signal, wherein the first switch is in an on state when the PWM signal is high;

the output terminal of the first operational amplifier is connected to a low potential terminal of an input voltage through a second switch, a control terminal of the second switch is connected to the PWM signal through an inverter, wherein, the second switch is an on state when the PWM signal is low;

wherein, in a continuous conduction mode (CCM) of the isolated switch-mode power supply, the main power transistor is turned on while the synchronous rectifier transistor has not yet been turned off.

2. The control circuit of the isolated switch-mode power supply according to claim 1, wherein the current flowing through the main power transistor is maintained at the predetermined current-limiting value; and the drain-source voltage of the main power transistor starts to decrease until the synchronous rectifier transistor is turned off.

3. The control circuit of the isolated switch-mode power supply according to claim 1, wherein the control circuit further comprises a logic control module, wherein the logic control module receives the control signal;

according to the control signal, when the control signal is invalid, the logic control module controls the current-limiting module not to work and the voltage of the control terminal of the main power transistor is pulled down, when the control signal is valid, the logic control module controls the current-limiting module to start working.

4. The control circuit of the isolated switch-mode power supply according to claim 1, wherein the control circuit further comprises a first resistor;

the main power transistor is connected to a low potential terminal of an input voltage through the first resistor, wherein, a first terminal of the first resistor is directly connected to the main power transistor and a second terminal of the first resistor is connected to the low potential terminal of the input voltage;

the second input terminal of the first operational amplifier is directly connected to the first terminal of the first resistor.

5. A control method for controlling the main power transistor in the isolated switch-mode power supply by the control circuit of the isolated switch-mode power supply of claim 1, the method comprising:

connecting the main power transistor to the primary-side winding of the isolated switch-mode power supply;

connecting the synchronous rectifier transistor to a secondary-side winding of the isolated switch-mode power supply, wherein a turn-on process of the main power transistor comprises the following stages:

a first stage: a control terminal of the main power transistor receives a control signal; when the control signal is changed from an invalidation state to a validation state that represents turn-on, a voltage of the control terminal of the main power transistor starts to increase, as the voltage of the control terminal increases, the main power transistor is turned on gradually, and a current flowing through the main power transistor starts to increase until reaches a predetermined current-limiting value;

a second stage: the current flowing through the main power transistor is maintained at the predetermined current-limiting value by controlling the voltage of the control terminal of the main power transistor, the synchronous rectifier transistor is turned off, an impedance between a drain terminal and a source terminal of the main power transistor decreases, and a drain-source voltage decreases, continuously;

a third stage: the current flowing through the main power transistor decreases from the predetermined current-limiting value to a normal operation value, the voltage of the control terminal of the main power transistor increases again and reaches a maximum value, and the main power transistor is completely in an ON condition in this case.

6. The control method of claim 5, wherein a maintenance of the current of the main power transistor at the predetermined current-limiting value comprises the following steps:

sampling the current flowing through the main power transistor;

performing an error-processing to a sampled signal and the predetermined current-limiting value;

adjusting, according to an error-processing result, the voltage of the control terminal of the main power transistor to make the current flowing through the main power transistor equal to the predetermined current-limiting value.

7. An isolated switch-mode power supply comprising the control circuit of the isolated switch-mode power supply in claim 1.

8. A driving method of the isolated switch-mode power supply of claim 7, the method comprising:

connecting the main power transistor to a primary-side winding of the isolated switch-mode power supply; and connecting a synchronous rectifier transistor to a secondary-side winding of the isolated switch-mode power supply; wherein a turn-on process of the main power transistor comprises the following stages:

a first stage: a control terminal of the main power transistor receives a control signal, the control signal is changed from an invalidation state to a validation state that represents turn-on; a voltage between a gate terminal and a source terminal starts to decrease, as a gate-source voltage decreases, the main power transistor is turned on gradually, a current flowing through the main power transistor starts to increase until reaches a predetermined current-limiting value;

a second stage: the current flowing through the main power transistor is maintained at the predetermined current-limiting value by controlling the gate-source voltage of the main power transistor, the synchronous rectifier transistor is turned off, an impedance between a drain terminal and a source terminal of the main power transistor decreases, and an absolute value of a drain-source voltage decreases continuously;

a third stage: the current flowing through the main power transistor decreases from the predetermined current-limiting value to a normal operation value; the gate-source voltage of the switch-mode transistor decreases again and the absolute value thereof reaches a maximum value, and the main power transistor is completely in an ON condition in this case.

9. The control circuit of the isolated switch-mode power supply according to claim 2, wherein the control circuit further comprises a logic control module, the logic control module receives the control signal;

according to the control signal, when the control signal is invalid, the logic control module controls the current-limiting module not to work and the voltage of the control terminal of the main power transistor is pulled down, when the control signal is valid, the logic control module controls the current-limiting module to start working.

10. The isolated switch-mode power supply according to claim 7,
   wherein the current flowing the main power transistor is maintained at the predetermined current-limiting value; and
   the drain-source voltage of the main power transistor starts to decrease until the synchronous rectifier transistor is turned off.

11. The isolated switch-mode power supply according to claim 7,
   the control circuit further comprises a logic control module, wherein
   the logic control module receives the control signal;
   according to the control signal, when the control signal is invalid, the logic control module controls the current-limiting module not to work and the voltage of the control terminal of the main power transistor is pulled down, when the control signal is valid, the logic control module controls the current-limiting module to start working.

12. The isolated switch-mode power supply according to claim 7, wherein the control circuit further comprises a first resistor;
   the main power transistor is connected to a low potential terminal of an input voltage through the first resistor, wherein, a first terminal of the first resistor is directly connected to the main power transistor and a second terminal of the first resistor is connected to the low potential terminal of the input voltage;
   the second input terminal of the first operational amplifier is directly connected to the first terminal of the first resistor.

* * * * *